United States Patent
Bang et al.

(10) Patent No.: US 9,037,364 B2
(45) Date of Patent: May 19, 2015

(54) METHOD AND SYSTEM FOR CONTROLLING ANTI-JERK OF VEHICLE

(71) Applicant: Hyundai Motor Company, Seoul (KR)

(72) Inventors: Jae Sung Bang, Gyeonggi-do (KR); Won Woo Suh, Seoul (KR); Hong Kee Sim, Seoul (KR); Youngkwan Ko, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/099,090

(22) Filed: Dec. 6, 2013

(65) Prior Publication Data

US 2014/0336885 A1 Nov. 13, 2014

(30) Foreign Application Priority Data

May 9, 2013 (KR) .......................... 10-2013-0052731

(51) Int. Cl.
*B60L 15/00* (2006.01)
*B60L 11/14* (2006.01)
*B60L 15/20* (2006.01)

(52) U.S. Cl.
CPC .................. *B60L 15/00* (2013.01); *B60L 11/14* (2013.01); *B60L 15/20* (2013.01); *B60L 2240/421* (2013.01); *B60L 2240/423* (2013.01); *B60L 2240/461* (2013.01); *B60L 2270/145* (2013.01); *Y02T 10/7077* (2013.01); *Y02T 10/7275* (2013.01); *Y02T 10/642* (2013.01); *Y02T 10/70* (2013.01)

(58) Field of Classification Search
USPC ....................................................... 701/51, 53
See application file for complete search history.

(56) References Cited

U.S. PATENT DOCUMENTS

| | | | |
|---|---|---|---|
| 6,806,667 B1 | 10/2004 | Sasaki et al. | |
| 8,175,779 B2 | 5/2012 | Sawada et al. | |
| 2004/0059489 A1* | 3/2004 | Hanggi et al. | 701/51 |
| 2013/0060407 A1* | 3/2013 | Bang | 701/22 |
| 2013/0103278 A1* | 4/2013 | Suzuki et al. | 701/70 |

FOREIGN PATENT DOCUMENTS

KR 10-2013-0002713 A 1/2013

* cited by examiner

*Primary Examiner* — Edwin A Young
(74) *Attorney, Agent, or Firm* — Mintz Levin Cohn Ferris Glovsky and Popeo, P.C.; Peter F. Corless

(57) ABSTRACT

A method and system for controlling anti-jerk in order to reduce vibration of a vehicle is provided. More specifically, a rotation speed ($\omega_m$) of a driving source device of the vehicle is received and a speed ($\omega_{lwh}$, $\omega_{rwh}$) of a left wheel and a right wheel connected to the driving source device is detected by a sensor respectively. Then, a controller, which receives this data, calculates an average speed ($\omega_{fwh}$) based on the detected left and right wheel speeds, produces a virtual speed through interpolation of the detected left and right wheel speeds and the average speed based on a predetermined sampling value, and calculates a model speed ($\omega_{ref}$) based on the detected left and right wheel speeds, the average speed, the virtual speed, and a final gear ratio ($\gamma_j$; where j is the number of the gear) considering a final reduction gear ratio (FGR) and a current gear of the vehicle.

7 Claims, 10 Drawing Sheets

METHOD AND SYSTEM FOR CONTROLLING ANTI-JERK OF VEHICLE

CROSS-REFERENCE TO RELATED APPLICATION

This application claims priority to and the benefit of Korean Patent Application No. 10-2013-0052731 filed in the Korean Intellectual Property Office on May 9, 2013, the entire contents of which are incorporated herein by reference.

BACKGROUND OF THE INVENTION (a) Field of the Invention

The present invention relates to a system and a system and method of controlling anti-jerk for reducing vibration of a vehicle.

(b) Description of the Related Art

As is generally known in the art, in vehicles which include gasoline combustion engines, diesel combustion engines, and/or motors, a substantial vibration is generated when torque is generated by a torque source (e.g., an engine or a motor) and disturbance, since the driveline of vehicles is composed of elastic materials instead of rigid materials.

Since drivability may deteriorate due to this vibration, it needs to be removed in order to improve merchantable quality of a vehicle. Particularly, since hybrid vehicles and an electric vehicles, which do not have a damping element such as a torque converter, are more vulnerable to vibration than a conventional internal-combustion engine vehicle. Thus, the hybrid and electric vehicles need more an optimized logic algorithm for anti-jerk.

FIG. 1 shows an exemplary anti-jerk logic according to a prior art. Referring FIG. 1, the exemplary anti-jerk logic removes vibration components from an actual motor/engine speed ($w_m$) to obtain a model speed ($w_{ref}$). One of the characteristics of the exemplary anti-jerk logic according to the prior art is to calculate the model speed using the actual motor/engine speed and torque command. As such, in the following equation, if $K \to \infty$, the model speed becomes the actual motor/engine speed, and if $K \to 0$, the model speed is calculated by an equation, $T_{ref} = J^*(dw_{ref}/dt)$, based on torque command ($T_{ref}$) and the vehicle's inertia (J).

$$\omega_{ref} = \frac{K}{Js+K}\omega_m + \frac{1}{Js+K}T_{ref}$$

However, according to the above logic, since the model speed is calculated based on a compensation gain parameter (K), when the K is not 0, vibration components of the actual motor/engine speed are included in the model speed. Conversely, when the K is set near 0, even though vibration components may be very small, there may be an error due to uncertainty of a logic model. As such, when a disturbance such as a sloped road is present, errors between an ideal model speed and a model speed based on a logic model increase as a result.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a system and a method of controlling anti-jerk for reducing vibration of a vehicle which can obtain an exact model speed in order to extract vibration components of a vehicle from a speed of a driving source. As such, the present invention advantageously, generates torque for vibration restraint by multiplying an average value of driving wheels by a gear ratio, calculating the model speed through an interpolation algorithm and a low pass filter, and then multiplying a difference between a motor speed and the model speed by a predetermined gain.

Accordingly, an exemplary embodiment of the present invention provides a method of controlling anti-jerk of a vehicle, including: receiving rotation speed ($\omega_m$) of a driving source device of the vehicle; detecting a speed ($\omega_{lwh}$, $\omega_{rwh}$) of a left wheel and a right wheel connected to the driving source device, respectively; calculating an average speed ($\omega_{fwh}$) based on the detected left and right wheel speeds; producing a virtual speed through interpolation of the detected left and right wheel speeds and the average speed based on a predetermined sampling value; and calculating a model speed ($\omega_{ref}$) based on the detected left and right wheel speeds, the average speed, the virtual speed, and a final gear ratio ($\gamma_j$; where j is the number of gears) considering a final reduction gear ratio (FGR) and a current gear of the vehicle. In some exemplary embodiments of the present invention, the method may further include passing the detected left and right wheel speeds and the average speed through a low pass filter to remove noises included in them.

Each speed of the left and right wheels may be detected by a wheel speed sensor, and each speed of the left and right wheels detected by the wheel speed sensor may be interpolated with a predetermined period that is shorter than a sampling period of the wheel speed sensor.

The method may further include producing n (where n is a natural number) virtual speeds between $\omega_{fwh}(k)$ (k=1, 2, ..., n) and $\omega_{fwh}(k+1)$ for the interpolation, wherein $\omega_{fwh}(k)$ is defined for a $k^{th}$ measured wheel speed and $\omega_{fwh}(k+1)$ is defined for a $(k+1)^{th}$ measured wheel speed.

The method may further include calculating a model speed ($\omega_{ref}(m)$ (m=1, 2, ...)) between the wheel speed $\omega_{fwh}(k)$ and the wheel speed $\omega_{fwh}(k+1)$ using the following equation.

$$\omega_{ref}(k \times n + i) = \omega_{fwh}(k) + (i-1) \times \frac{\omega_{fwh}(k+1) - \omega_{fwh}(k)}{n}$$

$$(i = 1, 2, \ldots, n)$$

Another embodiment of the present invention provides a method of controlling anti-jerk of a vehicle, including: receiving rotation speed ($\omega_m$) of a driving source device of the vehicle; detecting a speed ($\omega_{lwh}$, $\omega_{rwh}$) of a left wheel and a right wheel connected to the driving source device, respectively; calculating an average speed ($\omega_{fwh}$) based on the detected left and right wheel speeds; calculating a model speed ($\omega_{ref}$) using the following equation based on the detected left and right wheel speeds, the average speed, and a final gear ratio ($\gamma_j$; where j is the number of gears) considering a final reduction gear ratio (FGR) and a current gear of the vehicle; and subtracting the calculated model speed ($\omega_{ref}$) from the rotation speed ($\omega_m$) of the driving source device in order to calculate vibrating components for anti-jerk controlling.

$$\omega_{ref} = \frac{\omega_{lwh} + \omega_{rwh}}{2} \times \gamma_j$$

Yet another embodiment of the present invention provides a system for controlling anti-jerk of a vehicle, including: a left wheel speed sensor configured to detect speed of a left wheel; a right wheel speed sensor configured to detect speed of a right wheel; and a model speed calculator which includes a wheel average speed calculating unit to calculate average wheel speed of left and right wheel speeds, a low pass filter to remove noises of the left and right wheel speeds and the average wheel speed, and an interpolation unit to interpolate the left and right wheel speeds and the average wheel speed. The model speed calculator may be operated by a predetermined program. This predetermined program may include a series of commands for executing a method of controlling anti-jerk of a vehicle, including: receiving rotation speed ($\omega_m$) of a driving source device of the vehicle; detecting a speed ($\omega_{lwh}$, $\omega_{rwh}$) of a left wheel and a right wheel connected to the driving source device, respectively; calculating an average speed ($\omega_{fwh}$) based on the detected left and right wheel speeds; producing a virtual speed through interpolation of the detected left and right wheel speeds and the average speed based on a predetermined sampling value; and calculating a model speed ($\omega_{ref}$) based on the detected left and right wheel speeds, the average speed, the virtual speed, and a final gear ratio ($\gamma_j$; where j is the number of the gear) considering a final reduction gear ratio (FGR) and a current gear of the vehicle.

As described above, according to an exemplary embodiment of the present invention, when a model speed of a driving source is calculated using wheel speed of a vehicle, since it is not necessary to use inaccurate elements such as an inclination angle of a inclined road, gross vehicle weight change, air drag force by vehicle speed, and so on that are required for a model speed calculating logic of the prior art, it is possible to obtain the model speed of a driving source that is less uninfluenced by disturbance factors than in the prior art.

Advantageously, in comparison with the prior art, the exemplary embodiment of the present invention improves accuracy, and reduces the number of calculation parameters by more than 50%. As such, it is possible to improve anti-jerk performance and to shorten time of product development, mass production, application, and so on.

DETAILED DESCRIPTION OF THE EMBODIMENTS

Hereinafter, the present invention will be described more fully with reference to the accompanying drawings, in which exemplary embodiments of the invention are shown. The present invention may be modified in various different ways, and is not limited to the exemplary embodiments described herein.

In addition, in the following specification, unless explicitly described to the contrary, the word "comprise" and variations such as "comprises" or "comprising" will be understood to imply the inclusion of stated elements but not the exclusion of any other elements.

Moreover, a detailed description of various variables, signs, and constants of equations used in the specification that are apparent to a person having ordinary skill in the art is omitted for the purpose of simplifying the description.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
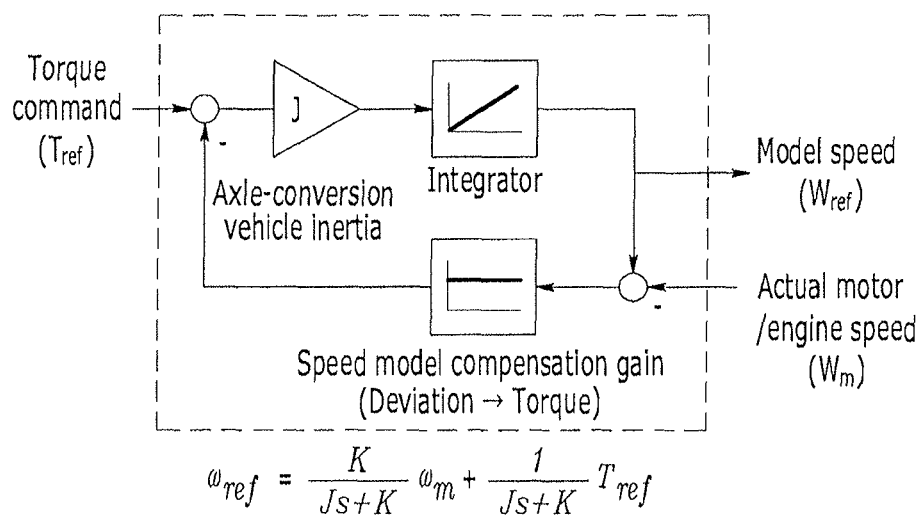
FIG. 1 is an exemplary diagram for illustrating a model speed calculating logic according to the prior art.
Figure 2:
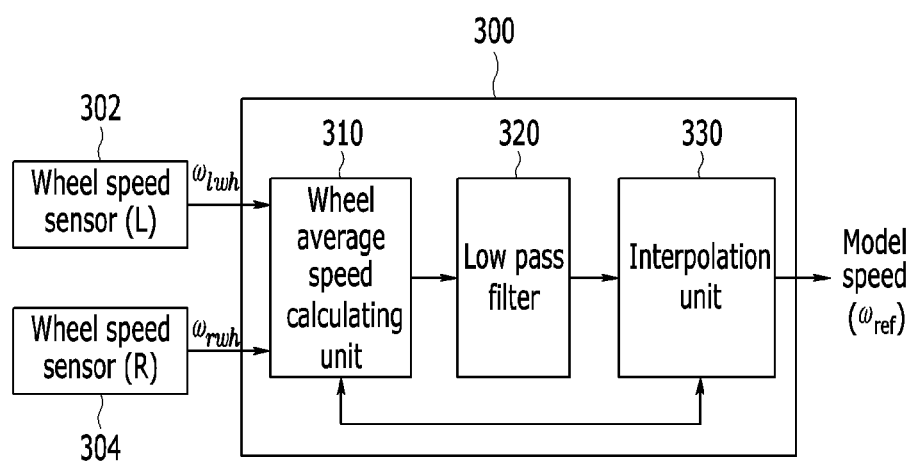
FIG. 2 is an exemplary diagram illustrating a system for controlling anti-jerk according to an exemplary embodiment of the present invention.

FIG. 2 is an exemplary diagram illustrating a system for controlling anti-jerk according to an exemplary embodiment of the present invention. The system for controlling anti-jerk according to an exemplary embodiment of the present invention is a system that obtains accurate model speed in order to extract vibration components of a vehicle from speed of driving sources.

Accordingly, the system for controlling anti-jerk may include: a left wheel speed sensor 302 configured to detect speed of a left wheel LW, a right wheel speed sensor 304 configured to detect speed of a right wheel RW, and a model speed calculator/controller 300 which is configured with a wheel average speed calculating unit 310 to calculate average wheel speed of left and right wheel speeds, a low pass filter 320 to remove noises of the left and right wheel speeds and the average wheel speed, and an interpolation unit 330 to interpolate the left and right wheel speeds and the average wheel speed.

The interpolation unit 330 of the model speed calculator 300 receives data from the low pass filter 320 in FIG. 2, but it should be understood that the scope of the present invention is not limited thereto. Other configurations, for example, a configuration in which positions of the interpolation unit and the low pass filter are exchanged (i.e., the data is received from the interpolation unit), that is capable of substantially interpolating the left and right wheel speeds and the average wheel speed and removing noises of the left and right wheel speeds and the average wheel speed, may be used as a replacement configuration in the exemplary embodiment of the present invention. Additionally, the wheel speed sensors 302 and 304, and the low pass filter 320, may be those typically applied in the related art, so the detailed descriptions thereof will be omitted in the present specification.

The model speed calculator/controller 300 may include one or more processors or microprocessors and/or hardware operated by a predetermined program including a series of commands for executing a method of controlling anti-jerk according to an exemplary embodiment of the present invention, which will be described below.

Hereinafter, a method of controlling anti-jerk according to an exemplary embodiment of the present invention will be described in detail with reference to the accompanying drawings.

Figure 3:
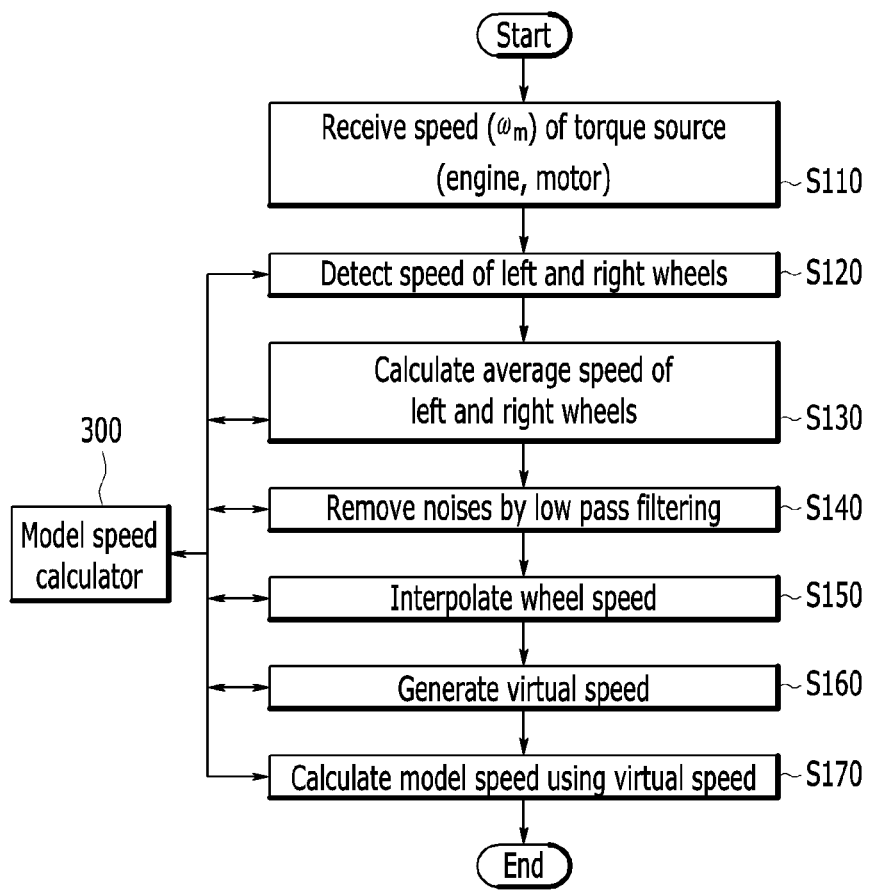
FIG. 3 is an exemplary flowchart illustrating a method of controlling anti-jerk according to an exemplary embodiment of the present invention.

FIG. 3 is an exemplary flowchart illustrating a method of controlling anti-jerk according to an exemplary embodiment of the present invention. The method of controlling anti-jerk calculates model speed (e.g., model speed of a motor) using rotational speed of left and right wheels (LW, RW). The model speed calculator 300 receives speed of a driving source (that is, a torque source) such as an engine and a motor (S110). In some embodiments of the present invention, the torque source may be, for example, a motor and/or an engine.

Figure 4:
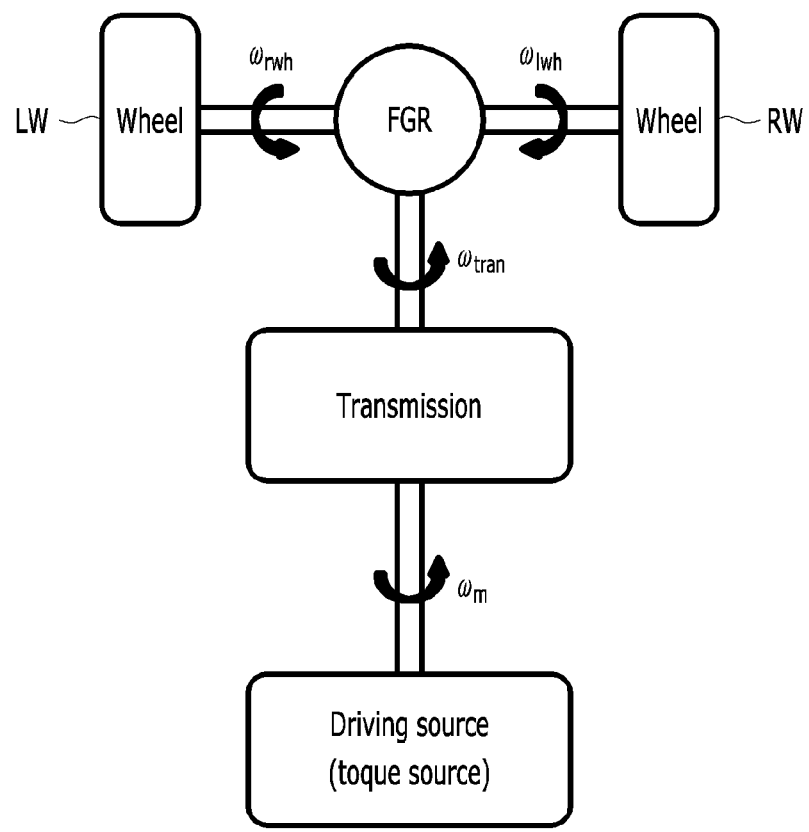
FIG. 4 is an exemplary diagram for illustrating operation according to an exemplary embodiment of the present invention.

In FIG. 4, $\omega_m$ designates a rotation speed of the torque source. The rotation speed ($\omega_m$) of the torque source may be easily received using any means known in the related art, and therefore a detailed description thereof will be omitted. Vibration components generated by torsion torque caused by rigidity of a drive shaft may be included in the rotation speed ($\omega_m$) of the torque source. The vibration components may cause deterioration of drivability. To suppress the vibration components, opposite direction torque of the vibration components may be applied to the torque source, which is generally referred to as anti-jerk control (AJC) in the automotive industry.

Figure 5:
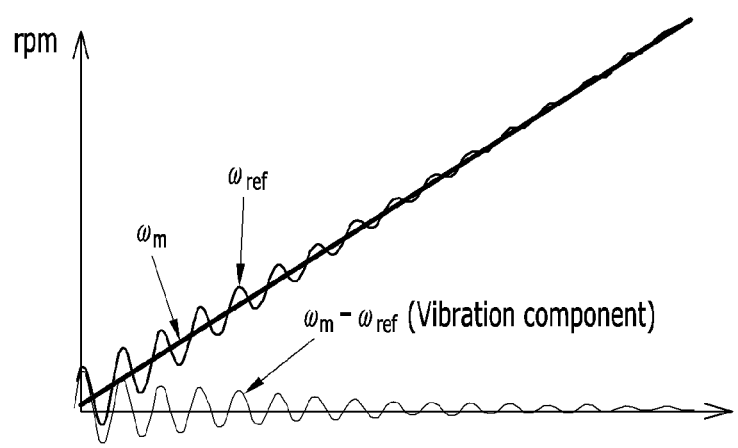
FIG. 5 to FIG. 9 are exemplary graphs illustrating operation according to an exemplary embodiment of the present invention, respectively.

Importantly, to effectively apply the AJC includes accurately determining the vibration components ($\omega_m - \omega_{ref}$), as shown in FIG. 5. Accordingly, an exact model speed ($\omega_{ref}$) is needed to extract the vibration components from the torque source, thus the method according to the exemplary embodiment of the present invention calculates the model speed using a speed ($\omega_{lwh}$, $\omega_{rwh}$) of a left wheel and a right wheel, respectively and extracts the vibration components using the model speed. The speeds ($\omega_{lwh}$, $\omega_{rwh}$) of left and right wheels are easily detected by the left wheel speed sensor 302 and the right wheel speed sensor 304 (S120).

Referring to FIG. 4, the left and right wheels (LW, RW) and the torque source are connected except during a gear-shifting period. Accordingly, the vibration components that are included in the speed ($\omega_m$) of the torque source are substantially not included in the speeds ($\omega_{lwh}$, $\omega_{rwh}$) of the left and right wheels (LW, RW) because of friction force between a vehicle and a road surface. Therefore, the model speed calculator 300 may calculate model speed ($\omega_{ref}$) by the following Equation 1 based on wheel speeds ($\omega_{lwh}$, $\omega_{rwh}$) detected by the left and right wheel speeds sensors 302 and 304.

$$\omega_{ref} = \frac{\omega_{lwh} + \omega_{rwh}}{2} \times \gamma_j \quad \text{Equation 1}$$

In Equation 1, $\gamma_j$ is a final gear ratio considering a final reduction gear ratio (FGR) and a current gear of the vehicle, and j is the number of the gear. Accordingly, in case of a seventh forward speed, j=1, 2, . . . , 7, 8, wherein numeral 8 designates a reverse speed.

However, when the model speed is simply calculated by Equation 1, several problems may occur.

First noise from the wheel speed sensors 302 and 304 is generated, second the sampling time of the wheel speed sensors installed to the wheels is different from that of the responsible controller, and third to the resolution of the wheel speed sensors is typically not satisfactory.

To solve the problems, the method according an exemplary embodiment of the present invention may calculate model speed ($\omega_{ref}$) as follows.

More specifically, the model speed calculator 300 may obtain wheel speeds detected by the wheel speed sensors 302 and 304 to pass through the low pass filter 320 in order to remove the noise included in the wheel speed (S140). Before obtaining the wheel speeds to pass through the low pass filter 320 in step S140, the model speed calculating 300 may optionally calculate left and right wheel average speed ($\omega_{wh}$) through the wheel average speed calculating unit 310 using the following Equation 2 (S130).

$$\omega_{wh} = \frac{\omega_{rwh} + \omega_{lwh}}{2} \quad \text{Equation 2}$$

Once the left and right wheel average speed ($\omega_{wh}$) has been calculated, the model speed calculator 300 may compensate a speed difference between both wheels according to running of the vehicle using the left and right wheel average speed ($\omega_{wh}$). For example, a hybrid vehicle generally performs the AJC in a traction motor (TrMt), and a gasoline vehicle performs the AJC in an engine.

A sampling period in which a motor control unit (MCU) that controls the motor (TrMt) and an engine management system (EMS) that controls the engine implement the AJC is typically faster than a sampling period of the wheel speed sensors 302 and 304. In addition, resolution of the MCU and EMS is typically better than resolution of the wheel speed sensors 302 and 304.

To solve the difference of the sampling period and resolution between the MCU, the EMS, and the wheel speed sensors, the interpolation unit 330 of the model speed calculator 300 performs interpolation (S150) on the detected wheel speeds.

Figure 6:
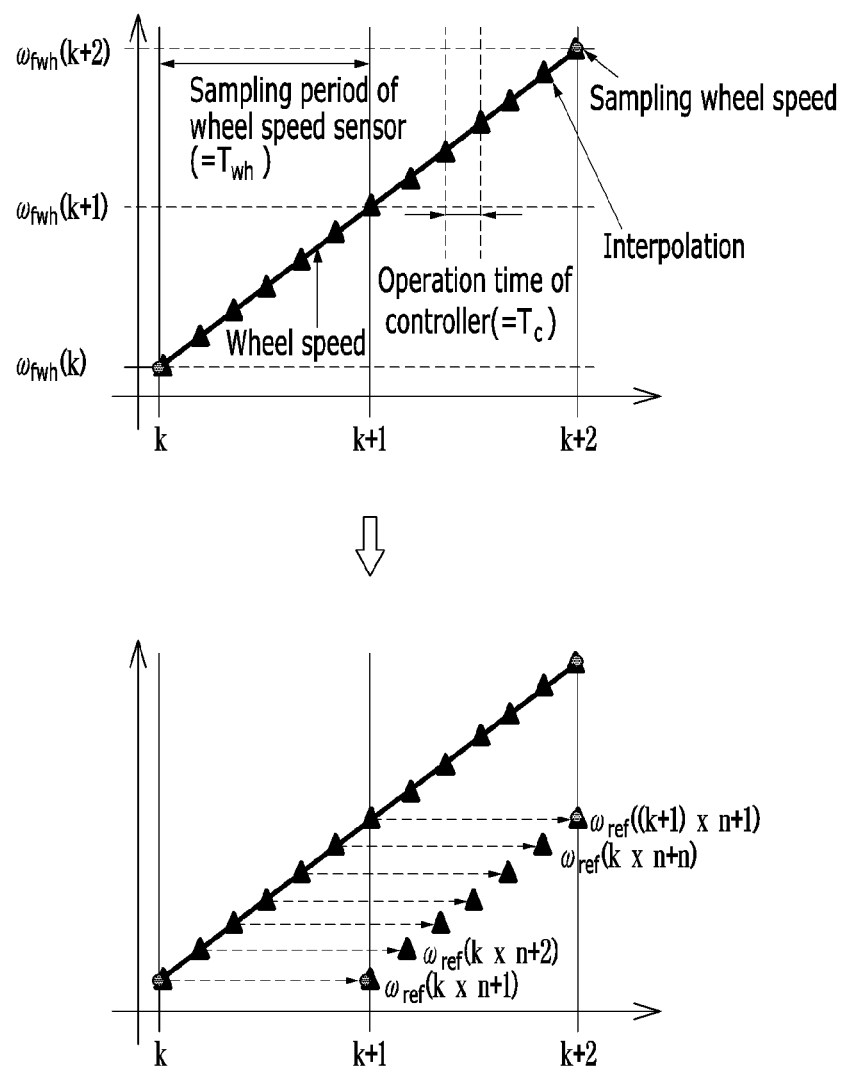

When the actual wheel speed indicated by a solid line of FIG. 6 is measured by the wheel speed sensors 302 and 304, the actual wheel speed is actually detected per sampling period shown by circle points. As shown in FIG. 6, when a $k^{th}$ measured wheel speed is referred to as $\omega_{fwh}(k)$ and a $(k+1)^{th}$ measured wheel speed is referred to as $\omega_{fwh}(k+1)$, the model speed calculator 300 may generate n (where n is a natural number) virtual speeds between the measured wheel speeds (S160).

When the n virtual speeds are generated, the model speed calculator 300 may generate model speed ($\omega_{ref}(m)$) (m=1, 2, . . . )) according to the following Equation 3 between the $k^{th}$ wheel speed ($\omega_{fwh}(k)$) and the $(k+1)^{th}$ wheel speed ($\omega_{fwh}(k+1)$), but it should be understood that the scope of the present invention is not limited thereto.

$$\omega_{ref}(k \times n + i) = \omega_{fwh}(k) + (i-1) \times \frac{\omega_{fwh}(k+1) - \omega_{fwh}(k)}{n}$$ Equation 3

$$(1 \le i \le n)$$

The model speed ($\omega_{ref}(m)$) generated by Equation 3 is a value of the model speed calculated between k and k+1, but the model speed calculator 300 uses a value of the model speed between k+1 and k+2 as shown in the graph of the lower part of FIG. 6. The reason to do so is because information of the $k^{th}$ and $(k+1)^{th}$ wheel speeds for interpolation is needed, so it is difficult to apply Equation 3 at the $k^{th}$ time. Accordingly, a delay time is applied for 1 sampling time. The delay time may be removed through predetermined elements such as a high pass filter 240 and/or a phase delay unit 250 shown in FIG. 10 to extract exact vibration components without delay.

In FIG. 3, the step S140 at which noises are removed by low pass filtering is in advance of the step S150 at which the wheel speeds are interpolated, but it should be understood that the scope of the present invention is not limited thereto. The spirit of the present invention can be applied in other configurations that may substantially interpolate the wheel speeds and remove noises by low pass filtering, for example. The other configurations may include a configuration in which the steps 140 and 150 are reversed.

Meanwhile, when AJC is restarted after being stopped, initialization of model speed is needed. When the initialization of the model speed is implemented, two problems occur, and an exemplary embodiment of the present invention solves the problems as follows.

The first problem is that it is impossible to implement interpolation at the initialization of the model speed. That is why wheel speed is needed at the sampling time next to the initialization, but a corresponding value does not exist. The second problem is that initial errors exist in the model speed calculated by Equation 3 and the actual speed of the torque source (e.g., motor speed) at the initialization.

Figure 7:
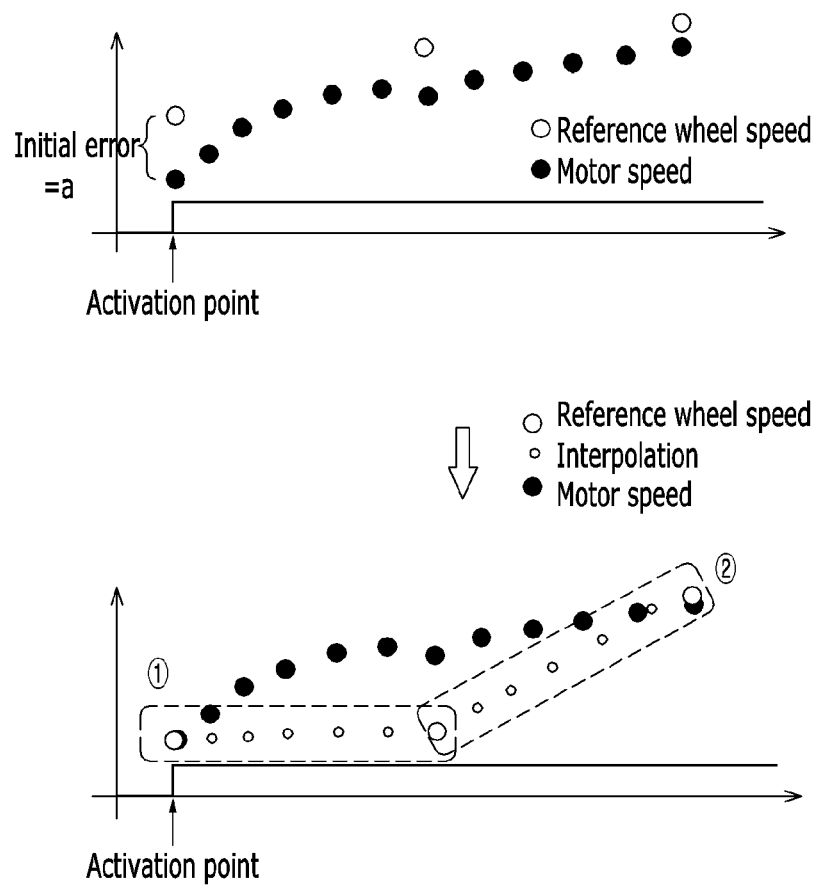

As shown in FIG. 7, for example, until data from a CAN (control area network) is received during activation of the AJC, 1 information set for the wheel speed exists. In addition, the motor speed and reference speed (model speed) based on the wheel speeds include an initial error (a).

Therefore, the model speed calculator 300 subtracts the initial error (a) from the reference speed until the activation of the AJC to next deactivation. In addition, the model speed calculator 300 uses "reference speed—a" as a value for interpolation between the first reference speed and the second reference speed. As described above, the model speed calculator 300 normally calculates the reference speed (model speed) using Equation 3 (S170).

With reference to the graph of the lower part of FIG. 7, contents according to a result of the process described above will be described as follows.

The section (1) indicated by a dotted line is an activated section in which only the first reference speed exists. Compared with the graph of the upper part of FIG. 7, it can be seen that the value of which the error (a) is subtracted from the reference speed of the activation point is maintained in the section (1). It can be seen that the value which is interpolated with the reference speed at the activation point of the upper graph and the second reference speed is used as the reference speed in the section (2).

Figure 8:
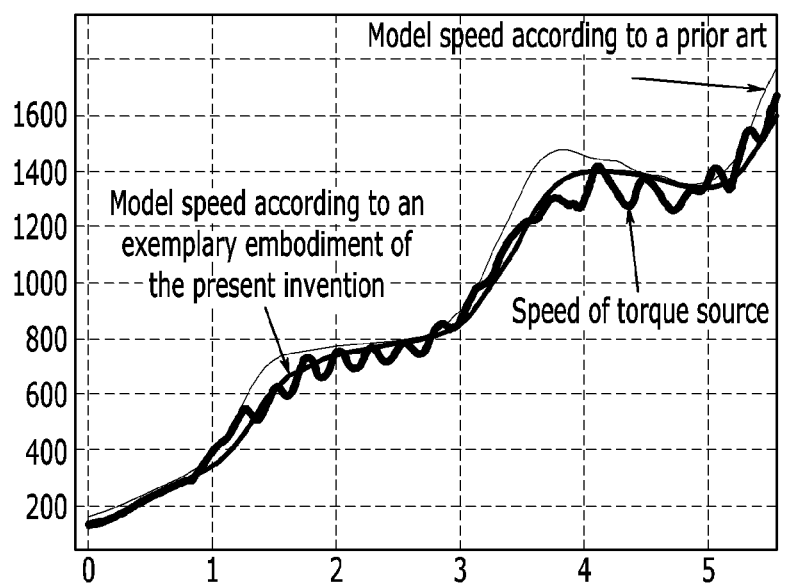
Figure 9:
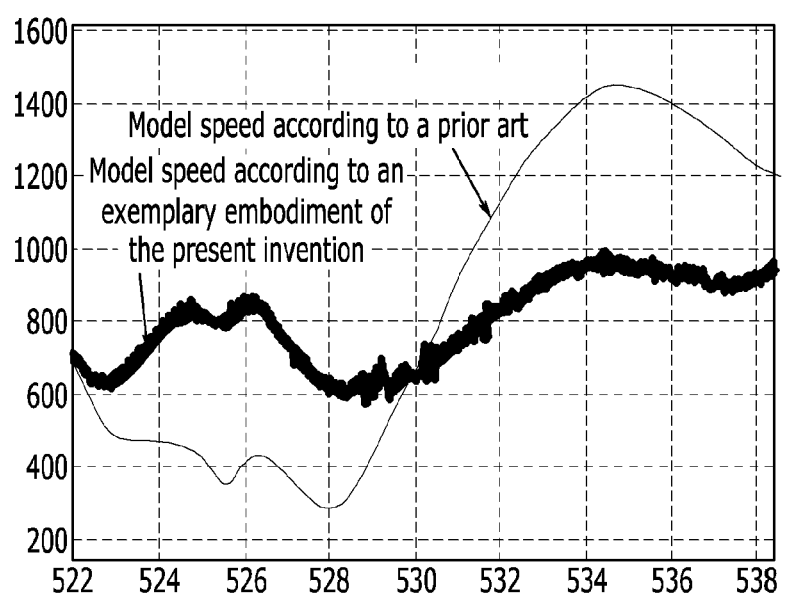

FIG. 8 and FIG. 9 show results that are simulated with test data according to an exemplary embodiment of the present invention. Thin solid lines shown in FIG. 8 and FIG. 9 denote speed of a torque source, it can be seen that vibration components are included in the speed of the torque source with reference to the thin solid lines. An ideal model speed may be obtained by following a median value of the thin solid line that includes the vibration components.

For example, it is possible to extract vibration components from speed of the torque source following the median value of vibration components like the model speed ($\omega_{ref}$) shown in FIG. 5, and to generate anti-jerk torque from the extracted vibration components.

FIG. 8 shows curves illustrating model speeds calculated based on data from an actual vehicle on a level road. Referring to FIG. 8, it can be seen that the model speed according to an exemplary embodiment of the present invention follows the median value of a torque source better than a prior art.

Referring to FIG. 9, when a vehicle is on a sloped road, it can be seen that there are several problems in model speed generated according to a prior art because of various reasons such as a sloped road and so on. Because an exemplary embodiment of the present invention may use a high pass filter 240 as shown in FIG. 10 to generate final anti-jerk torque, it is possible to compensate for errors between an ideal model speed (e.g., median value of speed of a torque source) and a calculated model speed.

Figure 10:
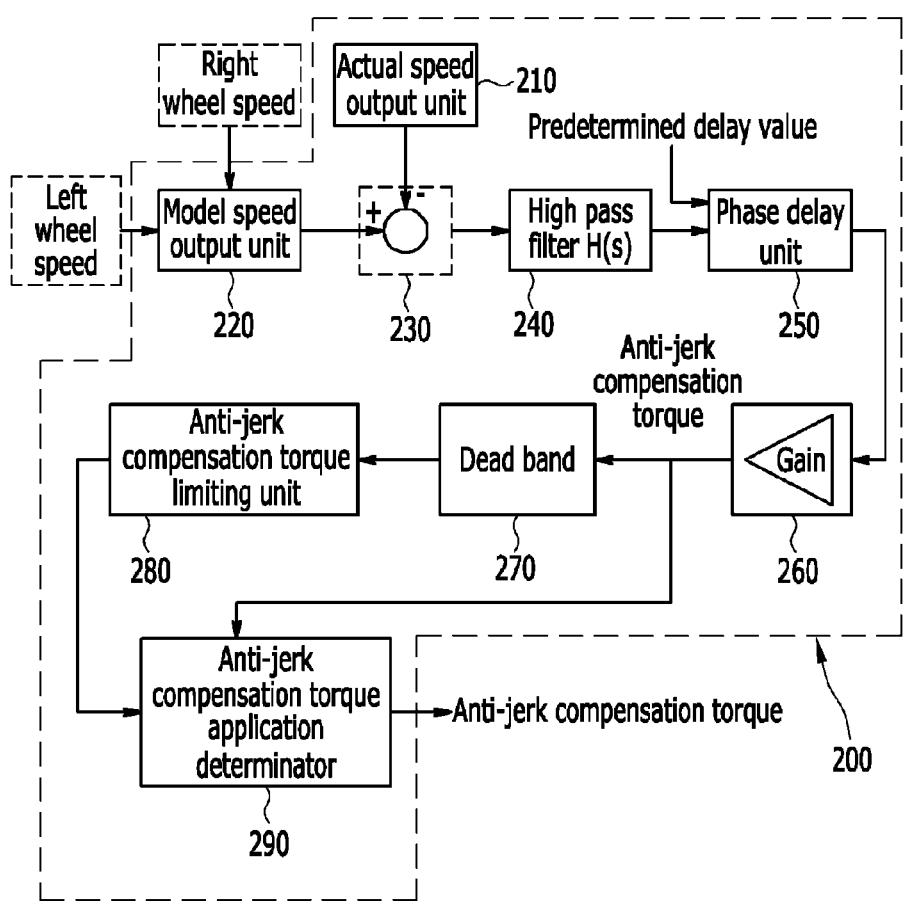
FIG. 10 is an exemplary diagram to which an exemplary embodiment of the present invention may be applied.

In FIG. 10, reference numeral 210 designates an actual speed output unit, reference numeral 220 a model speed output unit, reference numeral 250 a phase delay unit, reference numeral 260 a Gain, reference numeral 280 an anti-jerk compensation torque limiting unit, and reference numeral 290 an anti-jerk compensation torque application determinator.

However, when considerable errors exist as shown in FIG. 9, there may be a limit in compensation for errors by the high pass filter. In this case, since an anti-jerk control algorithm may be normally operated, in this regard, the model speed calculator/controller according the exemplary embodiment of the present invention has considerably good performance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 302, 304: Wheel speed sensor
300: Model speed calculator
310: Wheel average speed calculating unit
320: Low pass filter
330: Interpolation unit

What is claimed is:

1. A method of controlling anti-jerk of a vehicle, comprising:
receiving, at a controller, a rotation speed ($\omega_m$) of a driving source device of the vehicle;
detecting, by a sensor, a speed ($\omega_{fwh}$, $\omega_{rwh}$) of a left wheel and a right wheel connected to the driving source device, respectively;
calculating, by the controller, an average speed ($\omega_{fwh}$) based on the detected left and right wheel speeds;
producing, by the controller, a virtual speed through interpolation of the detected left and right wheel speeds and the average speed based on a predetermined sampling value;
calculating, by the controller, a model speed ($\omega_{ref}$) based on the detected left and right wheel speeds, the average speed, the virtual speed, and a final gear ratio ($\gamma_f$; where j is the number of the gear) considering a final reduction gear ratio (FGR) and a current gear of the vehicle;

subtracting, by the controller, the calculated model speed ($\omega_{ref}$) from the rotation speed ($\omega_m$) of the driving source device in order to calculate vibrating components for anti-jerk controlling; and controlling, by the controller, the driving source device to generate anti-jerk torque using the calculated vibrating components.

2. The method of claim 1, further comprising passing the detected left and right wheel speeds and the average speed through a low pass filter to remove noise included in the left and right wheel speeds.

3. The method of claim 2, wherein each speed of the left and right wheels is detected by a wheel speed sensor, and the speed of the left wheel and the right wheel is each interpolated respectively with a predetermined period that is shorter than a sampling period of the wheel speed sensor.

4. The method of claim 3, further comprising producing n (n is a natural number) virtual speeds between $\omega_{fwh}(k)$ (k=1, 2, ..., n) and $\omega_{fwh}(k+1)$ for the interpolation, wherein $\omega_{fwh}(k)$ is defined for a $k^{th}$ measured wheel speed and $\omega_{fwh}(k+1)$ is defined for a $(k+1)^{th}$ measured wheel speed.

5. The method of claim 4, further comprising calculating a model speed ($\omega_{ref}(m)$ (m=1, 2, ...)) between the wheel speed $\omega_{fwh}(k)$ and the wheel speed $\omega_{fwh}(k+1)$ using the following equation:

$$\omega_{ref}(k \times n + i) = \omega_{fwh}(k) + (i-1) \times \frac{\omega_{fwh}(k+1) - \omega_{fwh}(k)}{n}$$

$$(i = 1, 2, \ldots, n).$$

6. A method of controlling anti-jerk of a vehicle, comprising:

receiving, at a controller, rotation speed ($\omega_m$) of a driving source device of the vehicle;

detecting, by a sensor, a speed ($\omega_{fwh}$, $\omega_{rwh}$) of a left wheel and a right wheel connected to the driving source device;

calculating, by the controller, an average speed ($\omega_{fwh}$) based on the detected left and right wheel speeds;

calculating, by the controller, a model speed ($\omega_{ref}$) using the following equation based on the detected left and right wheel speeds, the average speed, and a final gear ratio ($\gamma_j$; where j is the number of the gear) considering a final reduction gear ratio (FGR) and a current gear of the vehicle, $$\omega_{ref} = \frac{\omega_{lwh} + \omega_{rwh}}{2} \times \gamma_j;$$

subtracting, by the controller, the calculated model speed ($\omega_{ref}$) from the rotation speed ($\omega_m$) of the driving source device in order to calculate vibrating components for anti-jerk controlling; and controlling, by the controller, the driving source device to generate anti-jerk torque using the calculating vibrating components.

7. A system for controlling anti-jerk of a vehicle, comprising:

a left wheel speed sensor configured to detect speed of a left wheel;

a right wheel speed sensor configured to detect speed of a right wheel; and a controller configured to include a wheel average speed calculating unit to calculate average wheel speed of left and right wheel speeds, a low pass filter to remove noises of the left and right wheel speeds and the average wheel speed, and an interpolation unit to interpolate the left and right wheel speeds and the average wheel speed, wherein the controller is operated by a predetermined program, and the program includes a series of commands for executing a method of controlling anti-jerk of a vehicle, comprising:

receiving rotation speed ($\omega_m$) of a driving source device of the vehicle;

detecting a speed ($\omega_{lwh}$, $\omega_{rwh}$) of a left wheel and a right wheel connected to the driving source device;

calculating an average speed ($\omega_{fwh}$) based on the detected left and right wheel speeds;

producing a virtual speed through interpolation of the detected left and right wheel speeds and the average speed based on a predetermined sampling value;

calculating a model speed ($\omega_{ref}$) based on the detected left and right wheel speeds, the average speed, the virtual speed, and a final gear ratio ($\gamma_j$; where j is the number of the gear) considering a final reduction gear ratio (FGR) and a current gear of the vehicle;

subtracting the calculated model speed ($\omega_{ref}$) from the rotation speed ($\omega_m$) of the driving source device in order to calculate vibrating components for anti-jerk controlling; and controlling the driving source device to generate anti-jerk torque using the calculated vibrating components.

* * * * *